(12) United States Patent
Sutardja

(10) Patent No.: US 9,941,774 B2
(45) Date of Patent: Apr. 10, 2018

(54) CONTROLLING FAN MOTORS USING CAPACITIVE SENSING

(71) Applicant: Marvell World Trade Ltd., St. Michael (BB)

(72) Inventor: Sehat Sutardja, Los Altos Hills, CA (US)

(73) Assignee: Marvell World Trade LTD., St Michael (BB)

( * ) Notice: Subject to any disclaimer, the term of this patent is extended or adjusted under 35 U.S.C. 154(b) by 1135 days.

(21) Appl. No.: 13/962,452

(22) Filed: Aug. 8, 2013

(65) Prior Publication Data

US 2014/0042877 A1 Feb. 13, 2014

Related U.S. Application Data

(60) Provisional application No. 61/680,929, filed on Aug. 8, 2012.

(51) Int. Cl.
| | | |
|---|---|---|
| *H02K 11/00* | (2016.01) | |
| *G01D 5/241* | (2006.01) | |
| *G01P 3/483* | (2006.01) | |
| *G01P 13/04* | (2006.01) | |
| *H02K 11/21* | (2016.01) | |

(52) U.S. Cl.
CPC ....... *H02K 11/0015* (2013.01); *G01D 5/2412* (2013.01); *G01P 3/483* (2013.01); *G01P 13/045* (2013.01); *H02K 11/21* (2016.01)

(58) Field of Classification Search
None
See application file for complete search history.

(56) References Cited

U.S. PATENT DOCUMENTS

| | | | | | |
|---|---|---|---|---|---|
| 4,400,641 | A | * | 8/1983 | Vishnevsky | H02N 2/002 310/323.02 |
| 4,694,235 | A | * | 9/1987 | Flowers | H02K 11/21 318/662 |
| 5,077,635 | A | * | 12/1991 | Bollhagen | G01D 5/2412 318/662 |

(Continued)

FOREIGN PATENT DOCUMENTS

| | | |
|---|---|---|
| DE | 102010046778 A1 | 3/2012 |
| GB | 1437785 A | 6/1976 |
| WO | WO-2009027504 A1 | 3/2009 |

OTHER PUBLICATIONS

International Search Report for PCT/US2013/054144 dated Nov. 4, 2014; 4 Pages.

*Primary Examiner* — Jermele M Hollington

(57) ABSTRACT

A motor having a rotor, the rotor including a first metal plate having a first size and a second metal plate having a second size arranged on a first surface associated with the rotor. The first metal plate and the second metal plate are arranged adjacent to each other at a predetermined distance from an axis of rotation of the rotor. The first surface rotates perpendicularly about the axis in response to the rotor being rotated about the axis. A stator includes a third metal plate arranged on a second surface associated with the stator. The third metal plate is arranged on the second surface at the predetermined distance from the axis. The second surface is parallel to the first surface and faces the first surface.

10 Claims, 9 Drawing Sheets

(56) References Cited

U.S. PATENT DOCUMENTS

| | | | | |
|---|---|---|---|---|
| 5,691,646 | A | * | 11/1997 | Sasaki .................. G01D 5/2415 324/662 |
| 5,920,198 | A | * | 7/1999 | Suzuki .................... G01B 3/18 324/662 |
| 6,127,764 | A | * | 10/2000 | Torok .................... H02K 1/276 310/156.53 |
| 7,315,102 | B2 | * | 1/2008 | Minagawa ............. H02K 21/24 310/156.32 |
| 8,807,956 | B2 | * | 8/2014 | Krishnamoorthy ... F04D 27/001 417/2 |
| 2003/0030351 | A1 | * | 2/2003 | Dinger .................. H02N 2/103 310/323.01 |
| 2004/0207385 | A1 | | 10/2004 | Gafner et al. |
| 2010/0026128 | A1 | * | 2/2010 | Ionel ..................... H02K 1/276 310/156.53 |
| 2012/0068649 | A1 | | 3/2012 | Krishnamoorthy et al. |
| 2013/0271119 | A1 | | 10/2013 | Backes et al. |

* cited by examiner

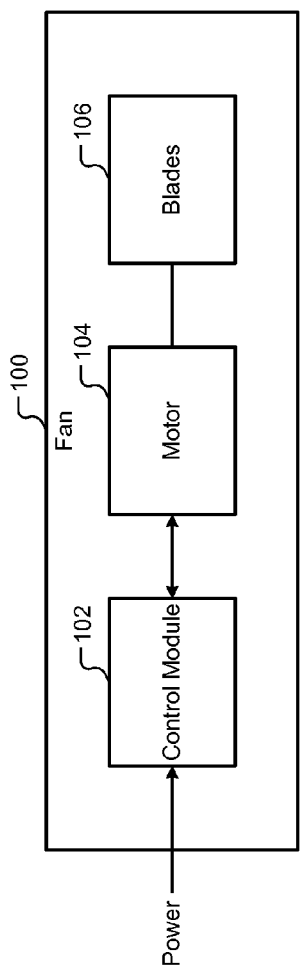
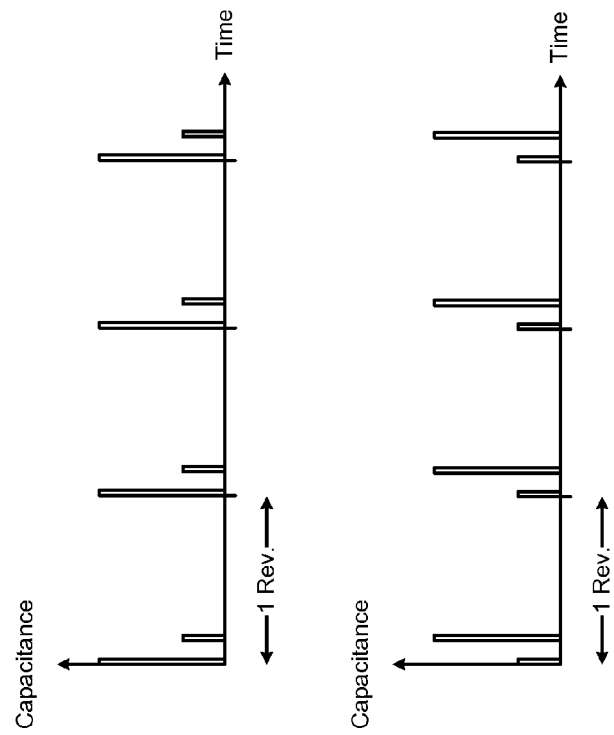
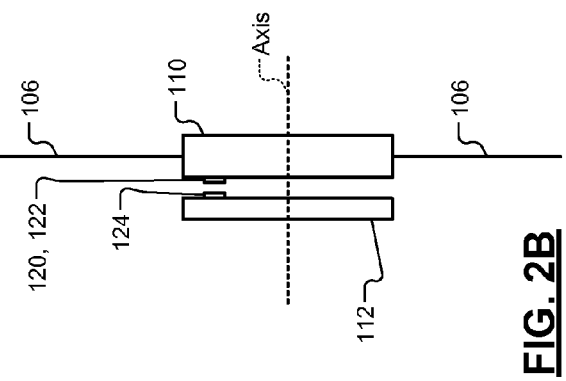

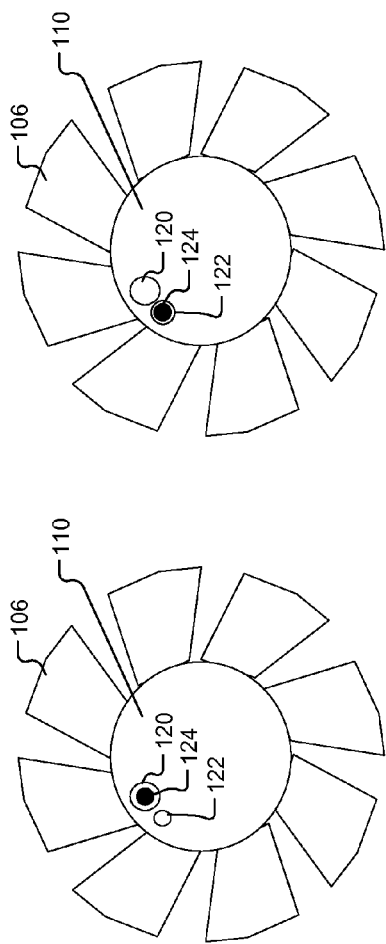
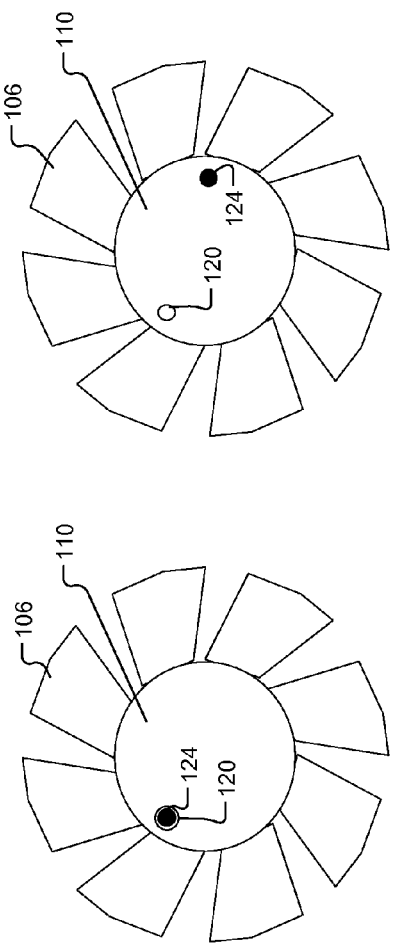
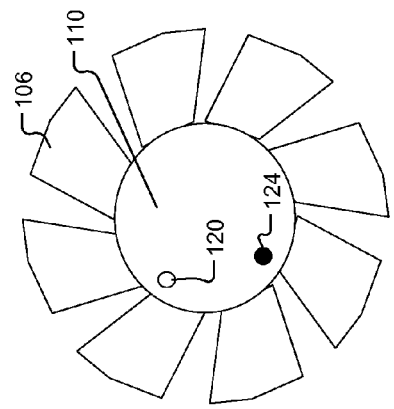
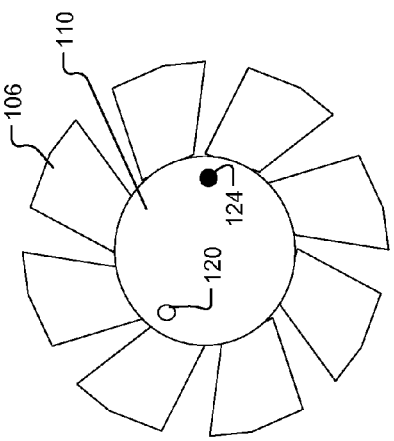

CONTROLLING FAN MOTORS USING CAPACITIVE SENSING

CROSS-REFERENCE TO RELATED APPLICATIONS

The present disclosure claims the benefit of U.S. Patent Application No. 61/680,929, filed on Aug. 8, 2012. The entire disclosure of the application referenced above is incorporated herein by reference.

FIELD

The present disclosure relates generally to controlling fan motors and more particularly to detecting direction of rotation and position of rotors of fan motors.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Electric motors are used in many applications. For example, single-phase and two-phase electric motors are used to drive cooling fans in electronic equipment. A fan may provide optimum airflow when the fan rotates in one direction as opposed to the other. This may primarily be due to the blade/wing design of the fan. Therefore, it may be efficient and desirable to rotate the fan in the direction that has maximum airflow for a given speed.

The speed of a motor can be determined in many ways. For example, Hall-effect sensors can be used to detect the speed of the motor. The Hall-effect sensors, however, increase the cost of cooling fans. Alternatively, the speed of the motor can be determined by sensing back-EMF of the motor. The back-EMF alone, however, can be insufficient to determine the direction in which the motor rotates.

SUMMARY

A motor comprises a rotor including a first metal plate having a first size and a second metal plate having a second size arranged on a first surface associated with the rotor. The first metal plate and the second metal plate are arranged adjacent to each other at a predetermined distance from an axis of rotation of the rotor. The first surface rotates perpendicularly about the axis in response to the rotor being rotated about the axis. A stator includes a third metal plate arranged on a second surface associated with the stator. The third metal plate is arranged on the second surface at the predetermined distance from the axis. The second surface is parallel to the first surface and faces the first surface.

In other features, a system comprises the motor and a capacitance sensing module. The capacitance sensing module is configured to sense, in response to the rotor being rotated, (i) a first capacitance in response to the first metal plate being proximate to the third metal plate and (ii) a second capacitance in response to the second metal plate being proximate to the third metal plate. The second capacitance is different than the first capacitance.

In another feature, the system further comprises a direction determination module configured to determine a direction of rotation of the rotor based on the first capacitance and the second capacitance.

In another feature, the system further comprises a direction determination module configured to determine a direction of rotation of the rotor by comparing a period of revolution of the rotor to a time interval between sensing the first capacitance and the second capacitance during one revolution of the rotor.

In other features, the capacitance sensing module is configured to sense the first capacitance or the second capacitance at a first time and a second time during two successive revolutions of the rotor, and the system further comprises a position determining module configured to determine position of the rotor based on (i) time elapsed from sensing the first capacitance or the second capacitance and (ii) a difference between the first time and the second time.

In still other features, a system comprises a motor and a capacitance sensing module. The motor includes (i) a first metal plate and a second metal plate arranged on a first surface associated with a rotor of the motor and (ii) a third metal plate arranged on a second surface associated with a stator of the motor. The first surface rotates perpendicularly about an axis of rotation of the rotor in response to the rotor being rotated about the axis. The capacitance sensing module is configured to sense, in response to the rotor being rotated, (i) a first capacitance in response to the first metal plate aligning with the third metal plate and (ii) a second capacitance in response to the second metal plate aligning with the third metal plate.

In other features, the first metal plate has a different size than the second metal plate; the first, second, and third metal plates are arranged at a predetermined distance from the axis of rotation of the rotor; and the first surface is parallel to and faces the second surface.

In another feature, the system further comprises a direction determination module configured to determine a direction of rotation of the rotor based on the first capacitance and the second capacitance.

In another feature, the system further comprises a direction determination module configured to determine a direction of rotation of the rotor by comparing a period of revolution of the rotor to a time interval between sensing the first capacitance and the second capacitance during one revolution of the rotor.

In other features, the capacitance sensing module is configured to sense the first capacitance or the second capacitance at a first time and a second time during two successive revolutions of the rotor, and the system further comprises a position determining module configured to determine position of the rotor based on (i) time elapsed from sensing the first capacitance or the second capacitance and (ii) a difference between the first time and the second time.

In still other features, a method comprises arranging a first metal plate and a second metal plate on a first surface associated with a rotor of a motor; and arranging a third metal plate on a second surface associated with a stator of the motor. The first surface rotates perpendicularly about an axis of rotation of the rotor in response to the rotor being rotated about the axis. The method further comprises sensing, in response to the rotor being rotated, (i) a first capacitance in response to the first metal plate aligning with the third metal plate and (ii) a second capacitance in response to the second metal plate aligning with the third metal plate.

In other features, the first metal plate has a different size than the second metal plate, and the method further comprises arranging the first, second, and third metal plates at a predetermined distance from the axis of rotation of the rotor; and arranging the first surface parallel to and facing the second surface.

In another feature, the method further comprises determining a direction of rotation of the rotor based on the first capacitance and the second capacitance.

In another feature, the method further comprises determining a direction of rotation of the rotor by comparing a period of revolution of the rotor to a time interval between sensing the first capacitance and the second capacitance during one revolution of the rotor.

In other features, the method further comprises sensing the first capacitance or the second capacitance at a first time and a second time during two successive revolutions of the rotor; and determining a position of the rotor based on (i) time elapsed from sensing the first capacitance or the second capacitance and (ii) a difference between the first time and the second time.

In still other features, a motor comprises a rotor and a stator. The rotor includes a first metal plate having a first length and a second metal plate having a second length arranged adjacent to each other on a first surface associated with the rotor, where the first length is greater than the second length. The stator includes a third metal plate and a fourth metal plate arranged on a second surface associated with the stator along a line perpendicular to an axis of rotation of the rotor. A distance between the third metal plate and the fourth metal plate is less than the first length and greater than the second length. The second surface is parallel to the first surface and faces the first surface.

In other features, a system comprises the motor and a capacitance sensing module. The capacitance sensing module is configured to sense, in response to the rotor being rotated, a difference in capacitance due to (i) the first metal plate being proximate to the third metal plate and the fourth metal plate at a first time and (ii) the second metal plate being proximate to the third metal plate or the fourth metal plate at a second time.

In another feature, the system further comprises a direction determination module configured to determine a direction of rotation of the rotor based on whether the difference in capacitance is an increase or decrease in capacitance.

In another feature, the rotor further comprises a fifth metal plate having the second length arranged on the first surface. The fifth metal plate is arranged adjacent to the first metal plate diagonally opposite to the second metal plate. The fifth metal plate and the second metal plate are arranged on opposite sides of the first metal plate.

In other features, a system comprises the motor and a capacitance sensing module. The capacitance sensing module is configured to sense, in response to the rotor being rotated, a difference in capacitance due to (i) the second metal plate or the fifth metal plate being respectively proximate to the third metal plate or the fourth metal plate at a first time, and (ii) the first metal plate being proximate to the third metal plate and the fourth metal plate at a second time.

In another feature, the system further comprises a direction determination module configured to determine a direction of rotation of the rotor based on whether the difference in capacitance is due to (i) the second metal plate or the fifth metal plate being proximate to the third metal plate or the fourth metal plate at the first time, and (ii) subsequently the first metal plate being proximate to the third metal plate and the fourth metal plate at the second time.

In another feature, the system further comprises a direction determination module configured to determine that the rotor rotates in a clockwise direction in response to the capacitance sensing module sensing the difference in capacitance due to (i) the fifth metal plate being proximate to the fourth metal plate at the first time, and (ii) subsequently the first metal plate being proximate to the third metal plate and the fourth metal plate at the second time.

In another feature, the system further comprises a direction determination module configured to determine that the rotor rotates in a counterclockwise direction in response to the capacitance sensing module sensing the difference in capacitance due to (i) the second metal plate being proximate to the third metal plate at the first time, and (ii) subsequently the first metal plate being proximate to the third metal plate and the fourth metal plate at the second time.

In still other features, a method comprises arranging a first metal plate having a first length and a second metal plate having a second length adjacent to each other on a first surface associated with a rotor of a motor, where the first length is greater than the second length; and arranging a third metal plate and a fourth metal plate on a second surface associated with a stator of the motor along a line perpendicular to an axis of rotation of the rotor. A distance between the third metal plate and the fourth metal plate is less than the first length and greater than the second length. The second surface is parallel to the first surface and faces the first surface.

In another feature, the method further comprises sensing, in response to the rotor being rotated, a difference in capacitance due to (i) the first metal plate being proximate to the third metal plate and the fourth metal plate at a first time and (ii) the second metal plate being proximate to the third metal plate or the fourth metal plate at a second time.

In another feature, the method further comprises determining a direction of rotation of the rotor based on whether the difference in capacitance is an increase or decrease in capacitance.

In another feature, the method further comprises arranging a fifth metal plate having the second length arranged on the first surface such that the fifth metal plate is adjacent to the first metal plate diagonally opposite to the second metal plate, and the fifth metal plate and the second metal plate are on opposite sides of the first metal plate.

In another feature, the method further comprises sensing, in response to the rotor being rotated, a difference in capacitance due to (i) the second metal plate or the fifth metal plate being respectively proximate to the third metal plate or the fourth metal plate at a first time, and (ii) the first metal plate being proximate to the third metal plate and the fourth metal plate at a second time.

In another feature, the method further comprises determining a direction of rotation of the rotor based on whether the difference in capacitance is due to (i) the second metal plate or the fifth metal plate being proximate to the third metal plate or the fourth metal plate at the first time, and (ii) subsequently the first metal plate being proximate to the third metal plate and the fourth metal plate at the second time.

In another feature, the method further comprises determining that the rotor rotates in a clockwise direction in response to sensing the difference in capacitance due to (i) the fifth metal plate being proximate to the fourth metal plate at the first time, and (ii) subsequently the first metal plate being proximate to the third metal plate and the fourth metal plate at the second time.

In another feature, the method further comprises determining that the rotor rotates in a counterclockwise direction in response to sensing the difference in capacitance due to (i) the second metal plate being proximate to the third metal plate at the first time, and (ii) subsequently the first metal plate being proximate to the third metal plate and the fourth metal plate at the second time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is a functional block diagram of a cooling fan according to the present disclosure.

FIG. 2B is a cross-section of the cooling fan showing arrangement of the metal plates mounted on the rotor and the stator according to the present disclosure.

FIG. 3A shows capacitances detected when the metal plates are arranged as shown in FIG. 2A and when the rotor rotates clockwise.

FIG. 3B shows capacitances detected when the metal plates are arranged as shown in FIG. 2A and when the rotor rotates anticlockwise.

FIG. 4A shows a first metal plate mounted on the rotor aligned with the metal plate mounted on the stator.

FIG. 4B shows a second metal plate mounted on the rotor aligned with the metal plate mounted on the stator.

FIG. 5A shows a metal plate mounted on the rotor aligned with the metal plate mounted on the stator.

FIG. 5B shows the metal plate mounted on the rotor having moved by 120° from the metal plate mounted on the stator.

FIG. 5C shows the metal plate mounted on the rotor having moved by 240° from the metal plate mounted on the stator.

In the drawings, reference numbers may be reused to identify similar and/or identical elements.

DESCRIPTION

The present disclosure relates to systems and methods for determining direction of rotation and position of a rotor of a fan motor without using Hall-effect sensors or back-EMF. Instead, the systems and methods described herein determine the direction and the position by sensing capacitances between a metal plate mounted on a stator and one or more metal plates mounted on the rotor as explained below in detail.

FIG. 1 shows a fan 100 according to the present disclosure. The fan 100 includes a control module 102, a motor 104, and blades 106. The control module 102 receives power from a power supply (not shown). The control module 102 controls the speed and direction of rotation of the motor 104 as described below in more detail. The blades 106 rotate at the speed and in the direction of rotation of the motor 104.

Figure 2A:
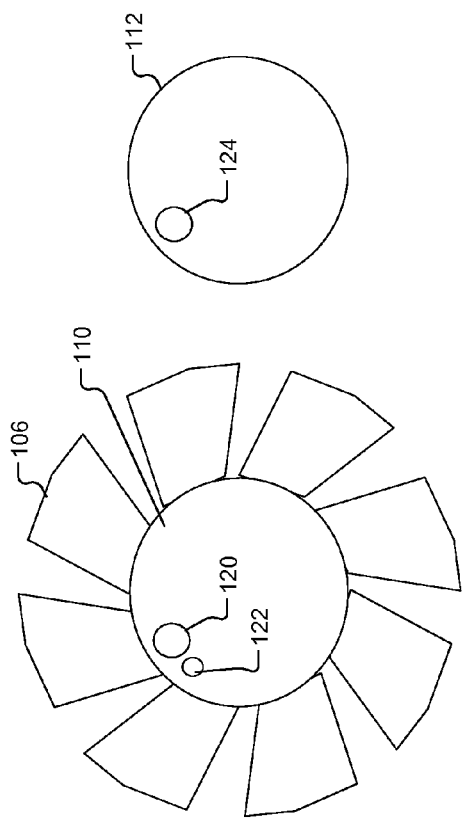
FIG. 2A depicts a first embodiment including a plurality of metal plates mounted on a rotor and a metal plate mounted on a stator to determine the direction and position of the rotor according to the present disclosure.

FIGS. 2A and 2B show the metal plates mounted on a rotor 110 and a stator 112 of the motor 104. In FIG. 2A, the blades 106 are attached to the rotor 110. A first metal plate 120 and a second metal plate 122 are mounted on a first surface associated with the rotor 110. For example, the first surface may be a surface of an enclosure that encloses the rotor 110. The first metal plate 120 is larger in size than the second metal plate 122. The first metal plate 120 and the second metal plate 122 are mounted adjacent to each other. The first metal plate 120 and the second metal plate 122 are arranged on the first surface at a predetermined distance from an axis about which the rotor 110 rotates.

A third metal plate 124 is mounted on a second surface associated with the stator 112. For example, the second surface may be a surface of a printed circuit board on which the control module 102 is mounted. The third metal plate 124 is arranged on the second surface at the predetermined distance from the axis about which the rotor 110 rotates. For example only, the first and second surfaces, and the metal plates 120, 122, and 124 are shown circular in shape. Other shapes or combinations of shapes may be used instead.

In FIG. 2B, the rotor 110 and the stator 112 are arranged such that the first surface associated with the rotor 110 is parallel to and faces the second surface associated with the stator 112. When the rotor 110 rotates, the first and second metal plates 120 and 122 mounted on the first surface associated with the rotor 110 pass in close proximity to the third metal plate 124 mounted on the second surface associated with the stator 112.

The control module 102 senses a first capacitance when the first metal plate 120 is proximate to and aligns with the third metal plate 124. The control module 102 senses a second capacitance when the second metal blade 122 is proximate to and aligns with the third metal plate 124. The first capacitance is different than the second capacitance since the size of the first metal plate 120 is different than the size of the second metal plate 122. For example, if the first metal plate 120 is greater in size than the second metal plate 122 as shown, the first capacitance will be greater than the second capacitance.

Figure 2C:
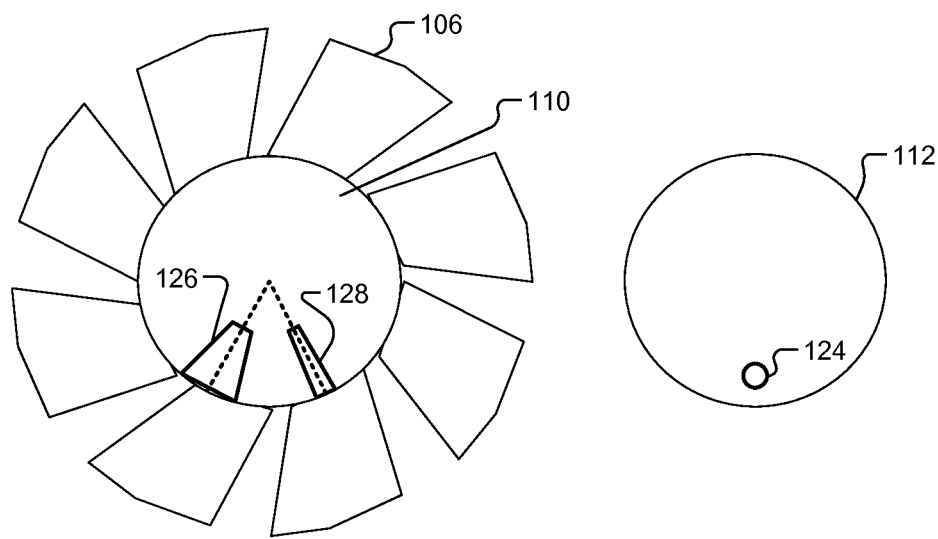
FIG. 2C depicts a second embodiment including a plurality of metal plates mounted on a rotor and a metal plate mounted on a stator to determine the direction of the rotor according to the present disclosure.

FIG. 2C shows another embodiment in which two metal plates 126 and 128 having different sizes are arranged adjacent to each other on the rotor 110. The metal plate 126 is greater in size than the metal plate 128. Instead of measuring the values of the capacitances formed by each of the two metal plates 126 and 128 and the third metal plate 124 on the stator 112, the control module 102 detects respective periods of time or duration during which the corresponding capacitances formed by the two plates 126 and 128 and the third metal plate 124 are sensed. The time period during which the capacitance formed by the metal plates 126 and 124 is sensed will be greater than the time period during which the capacitance formed by the metal plates 128 and 124 is sensed since the metal plate 126 is greater in size than the metal plate 128, thus causing the resulting capacitance attributed to metal plate 126 to be sensed or detected for a longer time period.

The direction of rotation of the rotor 110 can be determined by detecting a first amount of time during which a first capacitance formed by the metal plates 126 and 124 is sensed, a second amount of time during which a second capacitance formed by the metal plates 128 and 124 is sensed, and by determining whether the first amount of time is followed by or follows the second amount of time. The rotor 112 rotates in a clockwise direction if the first amount of time is followed by the second amount of time and in an anticlockwise direction if the first amount of time follows the second amount of time.

Figure 2D:
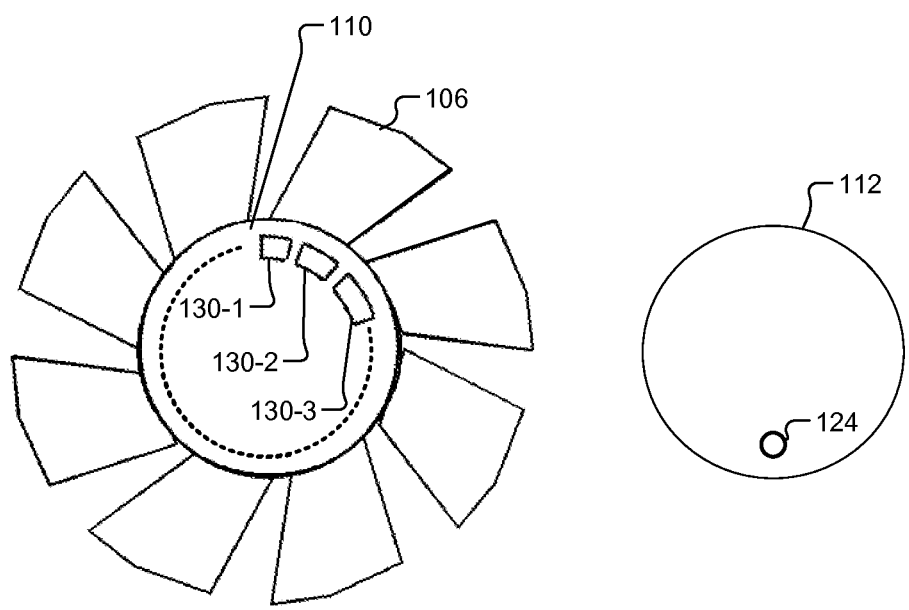
FIG. 2D depicts a third embodiment including a plurality of metal plates mounted on a rotor and a metal plate mounted on a stator to determine the direction of the rotor according to the present disclosure.

FIG. 2D shows another embodiment in which a plurality of metal plates 130-1, 130-2, 130-3, . . . , and 130-N, where N is an integer greater than or equal to 2 (collectively metal plates 130), having different sizes are arranged adjacent to each other along a perimeter of the rotor 110. The sizes of the metal plates 130 may follow a pattern. For example, a first set of four metal plates may gradually increase in size in the clockwise direction along the perimeter of the rotor 110. The first set may be followed by a second set of four metal plates that have the same size as the metal plates in the first set, and so on. Thus, the first and fifth metal plates may have a first size; the second and sixth metal plates may have a second size that is greater than the first size; the third and seventh metal plates may have a third size that is greater than the second size; and so on.

Accordingly, the amount of time during which the capacitances formed by each of the metal plates in the first and second sets and the third metal plate 124 are sensed will increase when the rotor 110 rotates in the clockwise direction. Conversely, the amount of time during which the capacitances formed by each of the metal plates in the first and second sets and the third metal plate 124 are sensed will decrease when the rotor 110 rotates in the clockwise direction. Therefore, the direction of rotation of the rotor 110 can be determined by detecting a pattern exhibited by the amounts of time during which the capacitances formed by the plurality of metal plates 130 and the third metal plate 124 are sensed. Knowing the order in which the metal plates 130 are arranged on the rotor 110, the direction of rotation of the rotor 110 can be determined based on the pattern exhibited by the detected amounts of time attributed to the capacitances formed by the plurality of metal plates 130 and the third metal plate 124. In other words, the metal plates 130 collectively represent a known pattern. By comparing a detected pattern (which is derived from detection of the respective capacitances attributed to the metal plates 130), the direction of rotation of the rotor 110 can be determined. It should be understood that either the detected capacitance values or the detected time periods during which respective capacitances are sensed can be used to detect or derive the pattern.

FIGS. 3A and 3B show the order and timing in which the first and second capacitances will be sensed depending on the direction of rotation of the rotor 110. For example, in FIG. 3A, suppose that the rotor 110 is rotating in the clockwise direction. During each revolution of the rotor 110, the first metal plate 120 will pass over the third metal plate 124 first, and then the second metal plate 122 will pass over the third metal plate 124. Since the first metal plate 120 is larger in size than the second metal plate 122, the larger capacitance will be sensed first, followed by the smaller capacitance. During each revolution of the rotor 110, the time between sensing the larger capacitance followed by the smaller capacitance will be less than the time between sensing the smaller capacitance followed again by the larger capacitance. Accordingly, the rotor 110 can be said to rotate in the clockwise direction if the larger and smaller capacitances are sensed in the order and with the timing shown in FIG. 3A.

Conversely, in FIG. 3B, suppose that the rotor 110 is rotating in anticlockwise direction. During each revolution of the rotor 110, the second metal plate 122 will pass over the third metal plate 124 first, and then the first metal plate 120 will pass over the third metal plate 124. Since the second metal plate 122 is smaller in size than the first metal plate 120, the smaller capacitance will be sensed first, followed by the larger capacitance. During each revolution of the rotor 110, the time between sensing the smaller capacitance followed by the larger capacitance will be less than the time between sensing the larger capacitance followed again by the smaller capacitance. Accordingly, the rotor 110 can be said to rotate in anticlockwise direction if the smaller and larger capacitances are sensed in the order and with the timing shown in FIG. 3B.

FIGS. 4A and 4B illustrate the process of detecting direction of rotation of the rotor 110 in further detail. In FIG. 4A, suppose that the rotor 110 is in state A when the first metal plate 120 mounted on the rotor 110 is aligned with the third metal plate 124 mounted on the stator 112. In FIG. 4B, suppose that the rotor 110 is in state B when the second metal plate 122 mounted on the rotor 110 is aligned with the third metal plate 124 mounted on the stator 112. Since the first metal plate 120 is larger in size than the second metal plate 122, the capacitance in state A will be greater than the capacitance and state B.

When the rotor 110 rotates at a constant angular velocity in the clockwise direction, during each revolution of the rotor 110, the time taken by the rotor 110 to move from state A to state B will be less than the time taken by the rotor 110 to move from state B to state A. Accordingly, the rotor 110 can be said to rotate in the clockwise direction if, during each revolution of the rotor 110, the time taken by the rotor 110 to move from state A to state B is less than the time taken by the rotor 110 to move from state B to state A.

Conversely, when the rotor 110 rotates at a constant angular velocity in anticlockwise direction, during each revolution of the rotor 110, the time taken by the rotor 110 to move from state A to state B will be greater than the time taken by the rotor 110 to move from state B to state A. Accordingly, the rotor 110 can be said to rotate in anticlockwise direction if, during each revolution of the rotor 110, the time taken by the rotor 110 to move from state A to state B is greater than the time taken by the rotor 110 to move from state B to state A.

The direction of rotation of the rotor 110 can also be determined by comparing a period of revolution of the rotor 110 to a time interval between sensing the larger capacitance and the smaller capacitance during one revolution of the rotor 110. The time interval when the rotor 110 rotates clockwise will be less than when the rotor 110 rotates anticlockwise. Accordingly, the ratio of the time interval to the period of revolution of the rotor 110 when the rotor 110 rotates clockwise will be less than the ratio when the rotor 110 rotates anticlockwise.

In addition to detecting the direction of rotation of the rotor 110, the position of the rotor 110 (i.e., pole position) can be determined as follows. Specifically, one or more metal plates mounted on the rotor 110 can be used together with a metal plate mounted on the stator 112 to determine angular position of the rotor 110 relative to the stator 112. Based on the position of the rotor 110, the motor 104 can be started and can be rotated at a predetermined speed.

FIGS. 5A to 5C illustrate the process of detecting position of the rotor 110 in further detail. For example only, FIGS. 5A to 5C show only one metal plate (e.g., the first metal plate 120) mounted on the rotor 110. More than one metal plate (e.g., the first and second metal plates 120 and 122) may be mounted on the rotor 110 to accurately determine position of the rotor 110. When the rotor 110 rotates, the first metal plate 120 mounted on the rotor 110 moves relative to the third metal plate 124 mounted on the stator 112. The third metal plate 124 mounted on the stator 112 serves as reference for tracking the movement of the rotor 110.

In FIG. 5A, the third metal plate 124 mounted on the stator 112 is aligned with the first metal plate 120 mounted on the rotor 110. In FIG. 5B, the rotor 110 has moved by 120° relative to the reference (i.e., the third metal plate 124 mounted on the stator 112). In FIG. 5C, the rotor 110 has moved by 240° relative to the reference.

When the rotor 110 moves at a constant angular velocity, a capacitance is sensed each time the first metal plate 120 mounted on the rotor 110 aligns with the third metal plate 124 mounted on the stator 112. A time difference between two successive crossings of the first metal plate 120 and the third metal plate 124 equals a period of revolution the rotor 110. To determine the position of the rotor 110 at a given time, an amount of time between the time of crossing of the metal plates 120 and 124 and the given time is measured. The amount of time is divided by the time between two successive crossings of the first metal plate 120 and the third metal plate 124 to obtain the position of the rotor 110.

The position of the rotor 110 can be determined more accurately by using more than one metal plate on the rotor 110 to obtain a plurality of position measurements. For example, a second metal plate (e.g., the second metal plate 122) can be mounted on the rotor 110. A second position measurement can be obtained using the second metal plate 122. The position measurements obtained using the first and second metal plates 120 and 122 can be averaged to improve accuracy of the position measurement.

Figure 6:
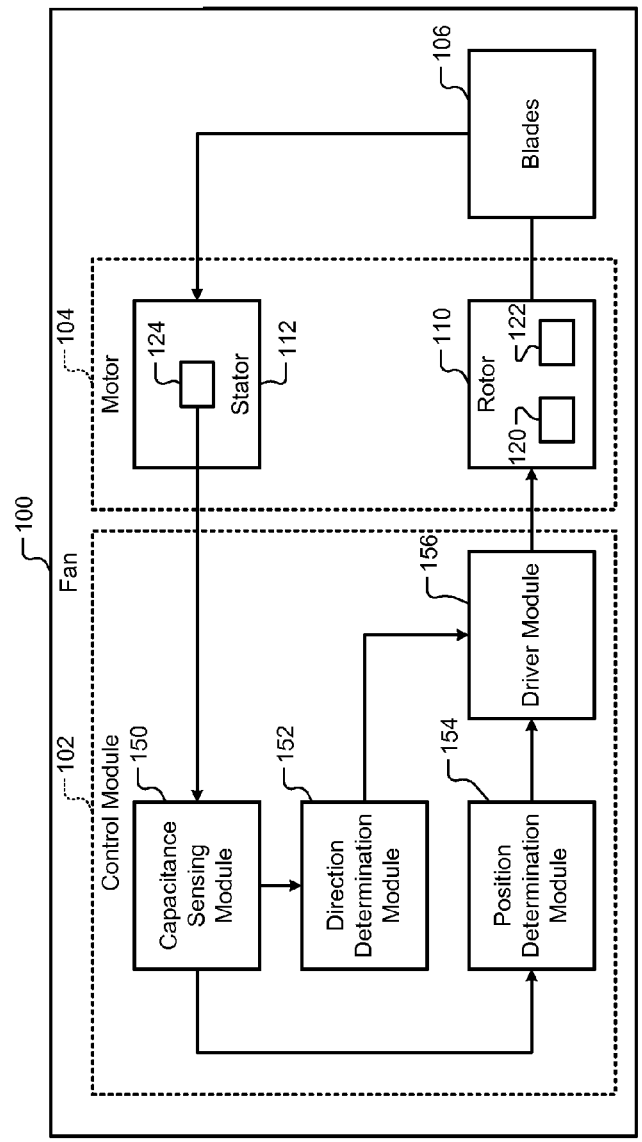
FIG. 6 shows a detailed functional block diagram of the cooling fan of FIG. 1.

FIG. 6 shows the fan 100 including the control module 102 that detects the direction of rotation and the position of the rotor 110 as described above. Specifically, the control module 102 includes a capacitance sensing module 150, a direction determination module 152, a position determination module 154, and a driver module 156. The capacitance sensing module 150 communicates with the third metal plate 124 mounted on the stator 112. Each time the first and second metal plates 120 and 122 pass over the third metal plate 124, the capacitance sensing module 150 senses a capacitance.

The direction determination module 152 determines the direction in which the rotor 110 rotates based on the capacitances sensed by the capacitance sensing module 150 as described above in detail. The position determination module 154 determines the position of the rotor 110 based on the capacitances sensed by the capacitance sensing module 150 as described above in detail. The driver module 156 drives the rotor 110 at a constant speed and in a predetermined direction. The driver module 156 can use the direction and position information obtained by the direction determination module 152 and the position determination module 154 to maintain or change the direction of rotation and/or speed of the rotor 110.

Figure 7:
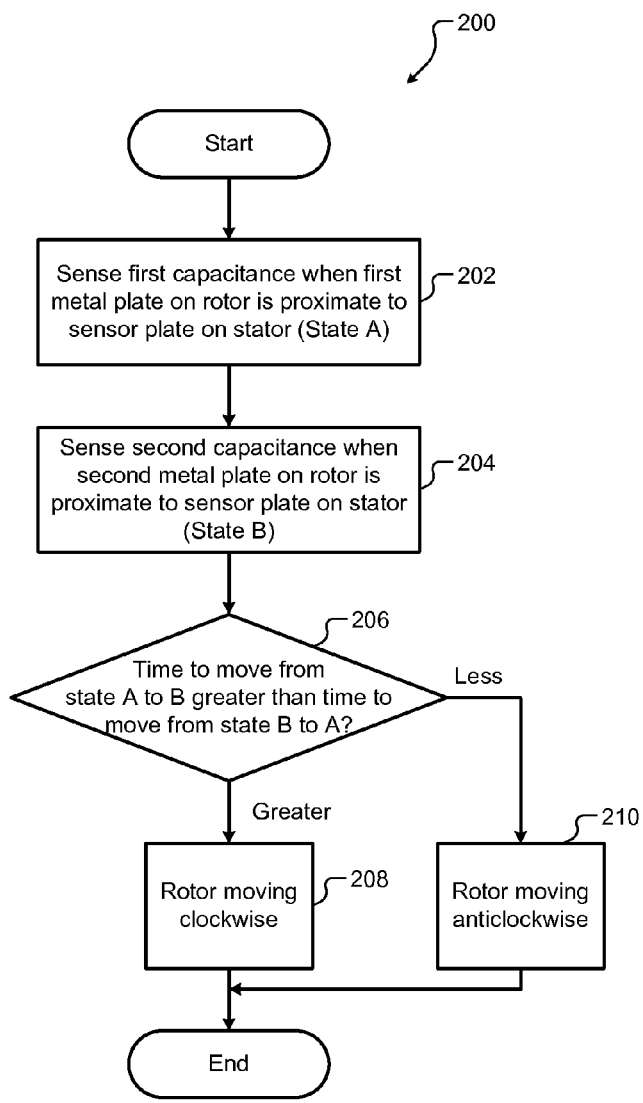
FIG. 7 shows a method for determining a direction of rotation of the rotor according to the present disclosure.

FIG. 7 shows a method 200 for determining the direction of rotation of the rotor 110. At 202, control senses a first capacitance when the first metal plate 120 mounted on the rotor 110 is proximate to a sensor plate (e.g., the third metal plate 124) mounted on the stator 112 (i.e., when the rotor 110 is in state A). At 204, control senses a second capacitance when the second metal plate 122 mounted on the rotor 110 is proximate to the sensor plate mounted on the stator 112 (i.e., when the rotor 110 is in state B). At 206, control determines whether time taken by the rotor 110 to move from state A to state B is greater or less than the time taken by the rotor 110 to move from state B to state A. At 208, control determines that the rotor 110 is rotating in clockwise direction if the time taken by the rotor 110 to move from state A to state B is greater than the time taken by the rotor 110 to move from state B to state A. At 210, control determines that the rotor 110 is rotating in anticlockwise direction if the time taken by the rotor 110 to move from state A to state B is less than the time taken by the rotor 110 to move from state B to state A.

Figure 8:
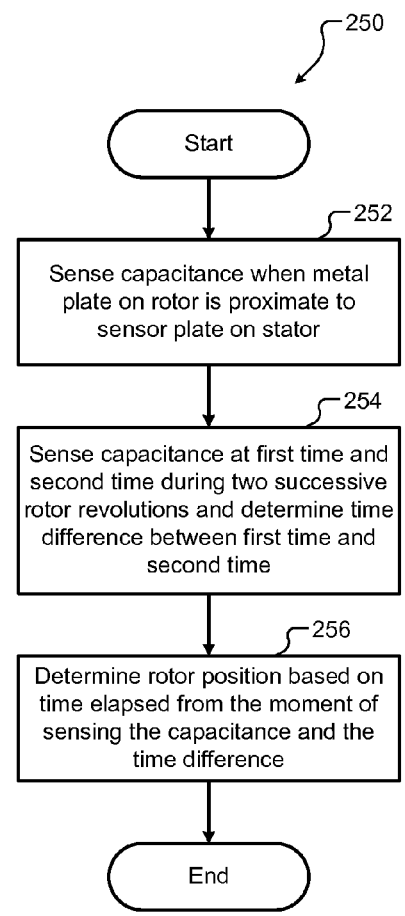
FIG. 8 shows a method for determining a position of the rotor according to the present disclosure.

FIG. 8 shows a method 250 for determining the position of the rotor 110. At 252, control senses a capacitance when a metal plate (e.g., the first metal plate 120) mounted on the rotor 110 is proximate to a sensor plate (e.g., the third metal plate 124) mounted on the stator 112. At 254, control senses the capacitance at a first time and a second time during two successive revolutions of the rotor 110 and determines a time difference between the first time and the second time. At 256, control determines the position of the rotor 110 based on the time elapsed from the moment of sensing the capacitance and the time difference.

Figure 9A:
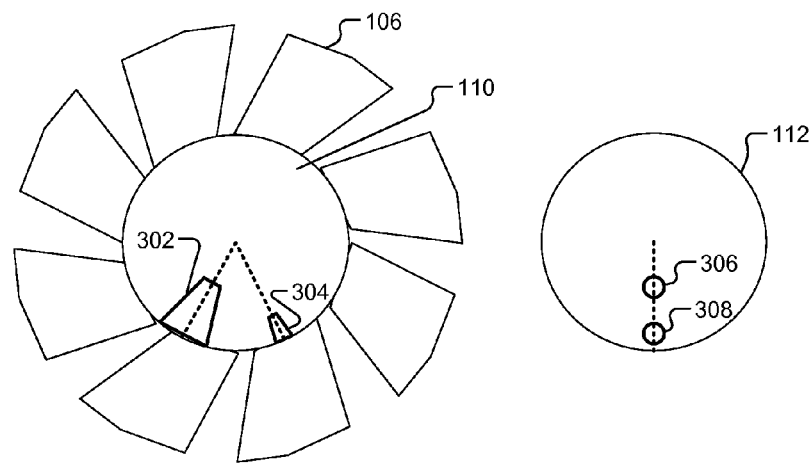
FIG. 9A depicts a plurality of metal plates mounted on a rotor and a plurality of metal plates mounted on a stator to determine a direction or rotation of the rotor according to the present disclosure.

Referring now to FIG. 9A, the rotor 110 and the stator 112 may each include a plurality of metal plates. For example, on the rotor 110, a first metal plate 302 having a first length and a second metal plate 304 having a second length are arranged adjacent to each other. The first length of the first metal plate 302 is greater than the second length of the second metal plate 304. While only two metal plates are shown for simplicity of illustration, additional metal plates similar to the first metal plate 302 and/or the second metal plate 304 may be arranged on the rotor 110.

Additionally, on the stator 112, a third metal plate 306 and a fourth metal plate 308 are arranged along a line perpendicular to an axis of rotation of the rotor 110. The size of the third metal plate 306 may be the same as the size of the fourth metal plate 308. The size of the third metal plate 306 and the fourth metal plate 308 may be similar to the size of the second metal plate 304.

A distance between the third metal plate 306 and the fourth metal plate 308 is such that when the rotor 110 rotates, the first metal plate 302 on the rotor 110 passes over both the third metal plate 306 and the fourth metal plate 308 on the stator 112, and the second metal plate 304 on the rotor 110 passes over only the fourth metal plate 308 on the stator 112. Alternatively, the second metal plate 304 may be arranged closer to the center of the rotor 110 instead of being closer to the perimeter of the rotor 110 as shown. When the second metal plate 304 is arranged closer to the center of the rotor 110, the second metal plate 304 passes over only the third metal plate 306 on the stator 112. In general, the distance between the third metal plate 306 and the fourth metal plate 308 may be less than the first length of the first metal plate 302 and greater than the second length of the second metal plate 304.

Figure 9B:
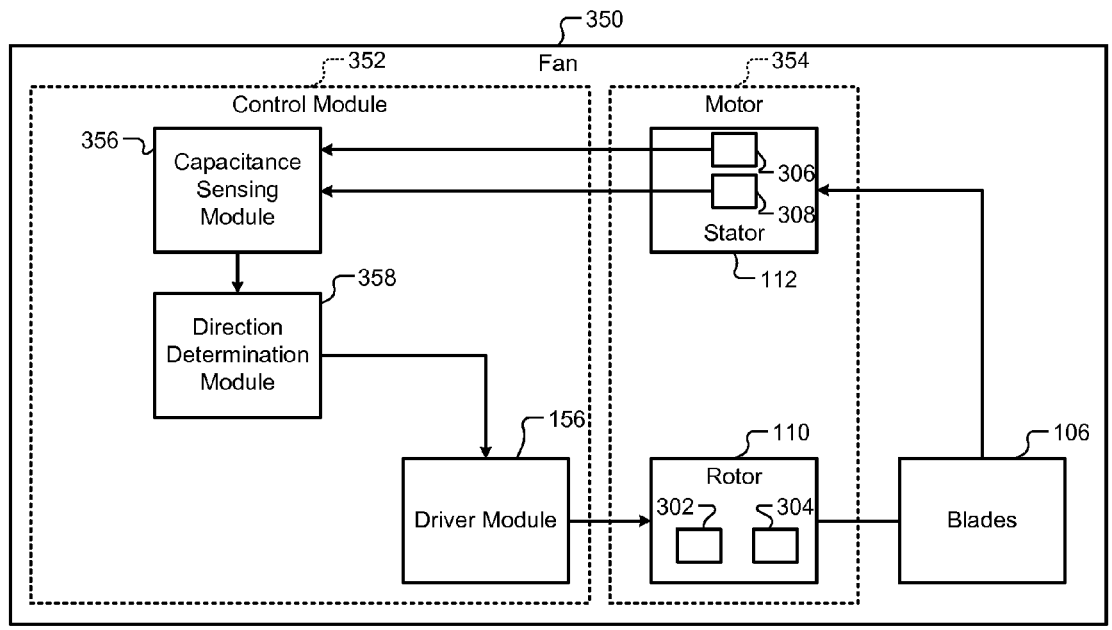
FIG. 9B is a functional block diagram of a cooling fan including the rotor and the stator of FIG. 9A and a control module to control the cooling fan according to the present disclosure.

Referring now to FIG. 9B, a fan 350 includes a control module 352, a motor 354, and the blades 106. The motor 354 includes the rotor 110 and the stator 112 each including the respective metal plates as shown in FIG. 9A. The control module 352 includes a capacitance sensing module 356, a direction determination module 358, and the driver module 156. The driver module 156 controls the speed and direction of rotation of the rotor 110 as explained with reference to FIG. 6.

When the rotor 110 rotates, the capacitance sensing module 356 senses a change in capacitance resulting from the metal plates on the rotor 110 passing over the metal plates on the stator 112. Specifically, the change in capacitance results from the first metal plate 302 passing over both the third metal plate 306 and the fourth metal plate 308 on the stator 112 at a first time, and the second metal plate 304 passing over the third metal plate 306 or the fourth metal plate 308 (depending on the location of the second metal plate 304 on the rotor 110) at a second time.

Depending on the direction in which the rotor 110 rotates, the change in capacitance can be an increase or decrease in capacitance. The direction determination module 358 determines whether the rotor 110 is rotating in a clockwise or counterclockwise direction depending on whether the change in capacitance sensed by the capacitance sensing module 356 is an increase or decrease in capacitance.

More specifically, when the rotor 110 rotates clockwise, the capacitance sensing module 356 senses a decrease in capacitance. This is because the first metal plate 302 passes over the third metal plate 306 and the fourth metal plate 308 forming a first capacitance, and subsequently the second metal plate 304 passes over the third metal plate 306 or the fourth metal plate 308 forming a second capacitance. The first capacitance is greater than the second capacitance because the first metal plate 302 is greater in size than the second metal plate 304, and the third metal plate 306 is of the same size as the fourth metal plate 308. Accordingly, when the rotor 110 rotates clockwise, the capacitance sensing module 356 senses a transition from first capacitance to second capacitance, which results in the change in capacitance being a decrease in capacitance.

Conversely, when the rotor 110 rotates counterclockwise, the capacitance sensing module 356 senses an increase in capacitance. This is because the second metal plate 304 passes over the third metal plate 306 or the fourth metal plate 308 forming the second capacitance, and subsequently the first metal plate 302 passes over the third metal plate 306 and the fourth metal plate 308 forming the first capacitance. Again, the first capacitance is greater than the second capacitance because the first metal plate 302 is greater in size than the second metal plate 304, and the third metal plate 306 is of the same size as the fourth metal plate 308. Accordingly, when the rotor 110 rotates counterclockwise, the capacitance sensing module 356 senses a transition from second capacitance to first capacitance, which results in the change in capacitance being an increase in capacitance.

Figure 10A:
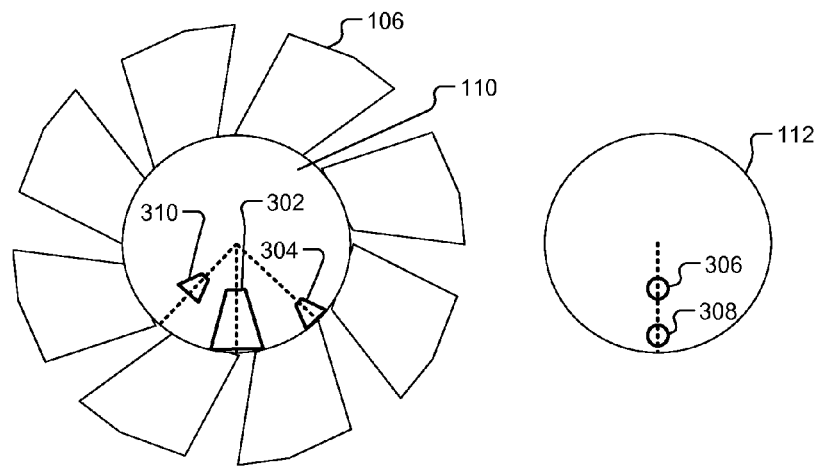
FIG. 10A depicts a plurality of metal plates mounted on a rotor and a plurality of metal plates mounted on a stator to determine and confirm a direction or rotation of the rotor according to the present disclosure.

Referring now to FIG. 10A, the rotor 110 and the stator 112 include all of the metal plates as shown in FIG. 9A, and in addition, the rotor 110 includes a fifth metal plate 310. The fifth metal plate is also arranged adjacent to the first metal plate 302. The fifth metal plate 310 and the second metal plate 304 are arranged on opposite sides of the first metal plate 302. The fifth metal plate 310 is arranged diagonally opposite to the second metal plate 304. While the second metal plate 304 is closer to the perimeter of the rotor 110, the fifth metal plate 310 is closer to the center of the rotor 110.

When the rotor 110 rotates, the second metal plate 304 passes over the fourth metal plate 308 on the stator 112, and the fifth metal plate 310 passes over the third metal plate 306 on the stator 112. The fifth metal plate 310 is of the same size as the second metal plate 304. Consequently, the capacitance formed by the fifth metal plate 310 while passing over the third metal plate 306 on the stator 112 is the same as the capacitance formed by the second metal plate 304 while passing over the fourth metal plate 308 on the stator 112.

Figure 10B:
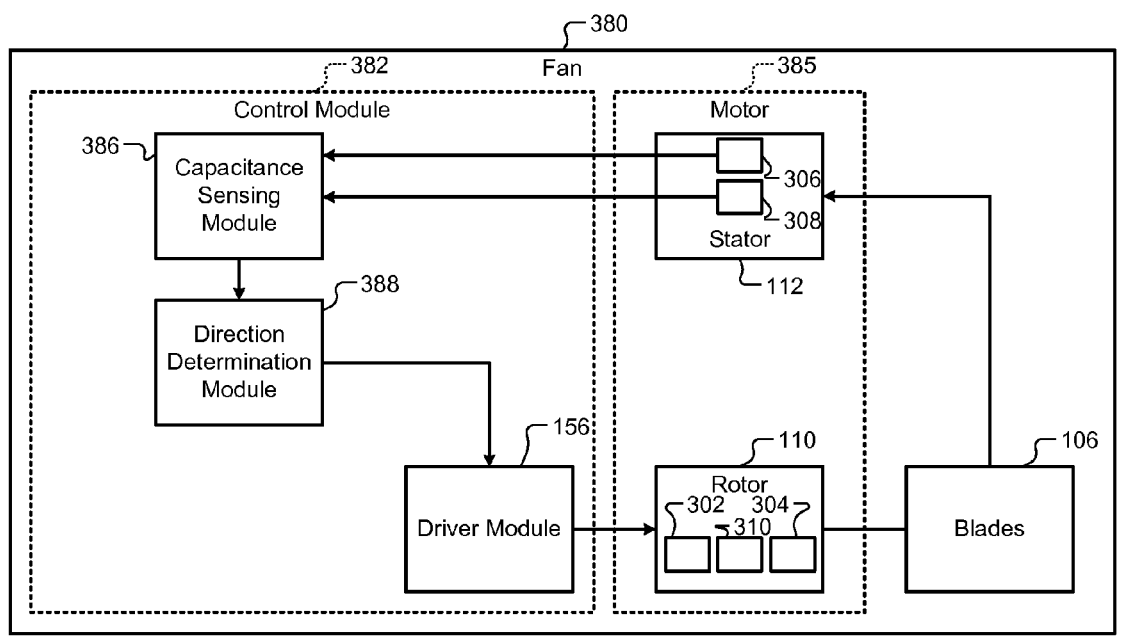
FIG. 10B is a functional block diagram of a cooling fan including the rotor and the stator of FIG. 10A and a control module to control the cooling fan according to the present disclosure.

Referring now to FIG. 10B, a fan 380 includes a control module 382, a motor 384, and the blades 106. The motor 384 includes the rotor 110 and the stator 112 each including the respective metal plates as shown in FIG. 10A. The control module 382 includes a capacitance sensing module 386, a direction determination module 388, and the driver module 156. The driver module 156 controls the speed and direction of rotation of the rotor 110 as explained with reference to FIG. 6.

When the rotor 110 rotates, the capacitance sensing module 386 senses a change in capacitance resulting from the metal plates on the rotor 110 passing over the metal plates on the stator 112. Specifically, the change in capacitance results from the second metal plate 304 or the fifth metal plate 310 respectively passing over the third metal plate 306 and the fourth metal plate 308, and subsequently the first metal plate 302 passing over both the third metal plate 306 and the fourth metal plate 308. Depending on the direction of rotation of the rotor 110, the second metal plate 304 will pass over the fourth metal plate 308 or the fifth metal plate 310 will pass over the third metal plate 306, and subsequently the first metal plate 302 will pass over both the third metal plate 306 and the fourth metal plate 308.

The direction determination module 358 determines that the rotor 110 is rotating in clockwise direction if the change in capacitance sensed by the capacitance sensing module 356 is due to the fifth metal plate 310 passing over the third metal plate 306 at a first time, followed by the first metal plate 302 passing over both the third metal plate 306 and the fourth metal plate 308 at a second time. Conversely, the direction determination module 358 determines that the rotor 110 is rotating in counterclockwise direction if the change in capacitance sensed by the capacitance sensing module 356 is due to the second metal plate 304 passing over the fourth metal plate 308 at a first time, followed by the first metal plate 302 passing over both the third metal plate 306 and the fourth metal plate 308 at a second time.

In either direction, the capacitance sensing module 356 senses an increase in capacitance. For example, when the rotor 110 rotates clockwise, the fifth metal plate 310 passes over the third metal plate 306 forming a first capacitance, and subsequently the first metal plate 302 passes over the third metal plate 306 and the fourth metal plate 308 forming a second capacitance. The second capacitance is greater than the first capacitance because the first metal plate 302 is greater in size than the fifth metal plate 310, and the third metal plate 306 is of the same size as the fourth metal plate 308. Accordingly, when the rotor 110 rotates clockwise, the capacitance sensing module 386 senses a transition from first capacitance to second capacitance, which results in the change in capacitance being an increase in capacitance.

Conversely, when the rotor 110 rotates counterclockwise, the second metal plate 304 passes over the fourth metal plate 308 forming the first capacitance, and subsequently the first metal plate 302 passes over the third metal plate 306 and the fourth metal plate 308 forming the second capacitance. Again, the second capacitance is greater than the first capacitance because the first metal plate 302 is greater in size than the second metal plate 304 while the third metal plate 306 is of the same size as the fourth metal plate 308. Accordingly, when the rotor 110 rotates clockwise, the capacitance sensing module 386 senses a transition from first capacitance to second capacitance, which results in the change in capacitance being an increase in capacitance.

In some implementations, the capacitance sensing module 386 may sense a sequence in which the third metal plate 306 and the fourth metal plate 308 detect the second metal plate 304, the first metal plate 302, and the fifth metal plate 310. The direction determination module 388 may determine and confirm the direction of rotation of the rotor 110 based on the sequence detected by the capacitance sensing module 386.

For example, when the rotor 110 rotates clockwise, the third metal plate 306 and the fourth metal plate 308 will detect the metal plates on the rotor 110 in the following sequence: the fifth metal plate 310, followed by the first metal plate 302, followed by the second metal plate 304. The capacitance sensing module 386 can detect the sequence by detecting an increase in capacitance as the fifth metal plate 310 passes over the third metal plate 306, and the first metal plate 302 passes over the third metal plate 306 and the fourth metal plate 308, followed by a decrease in capacitance as the second metal plate 304 passes over the fourth metal plate 308.

The direction determination module 388 can determine that the rotor 110 is rotating in clockwise direction when the capacitance sensing module 386 detects the increase in capacitance as the fifth metal plate 310 passes over the third metal plate 306 and subsequently the first metal plate 302 passes over the third metal plate 306 and the fourth metal plate 308. The direction determination module 388 can confirm that the rotor 110 is rotating in clockwise direction when after detecting the increase in capacitance, the capacitance sensing module 386 detects a decrease in capacitance as the second metal plate 304 passes over the fourth metal plate 308.

Conversely, when the rotor 110 rotates counterclockwise, the third metal plate 306 and the fourth metal plate 308 will detect the metal plates on the rotor 110 in the following sequence: the second metal plate 304, followed by the first metal plate 302, followed by the fifth metal plate 310. The capacitance sensing module 386 can detect the sequence by detecting an increase in capacitance as the second metal plate 304 passes over the fourth metal plate 308, and the first metal plate 302 passes over the third metal plate 306 and the fourth metal plate 308, followed by a decrease in capacitance as the fifth metal plate 310 passes over the third metal plate 306.

The direction determination module 388 can determine that the rotor 110 is rotating in counterclockwise direction when the capacitance sensing module 386 detects the increase in capacitance as the second metal plate 304 passes over the fourth metal plate 308 and subsequently the first metal plate 302 passes over the third metal plate 306 and the fourth metal plate 308. The direction determination module 388 can confirm that the rotor 110 is rotating in counterclockwise direction when after detecting the increase in capacitance, the capacitance sensing module 386 detects a decrease in capacitance as the fifth metal plate 310 passes over the third metal plate 306.

In FIGS. 9B and 10B, the capacitance sensing modules 356 and 386 do not measure values of capacitances as the rotor 110 passes over the stator 112. Instead, the capacitance sensing modules 356 and 386 simply sense a difference in capacitances as the rotor 110 passes over the stator 112.

Figure 11A:
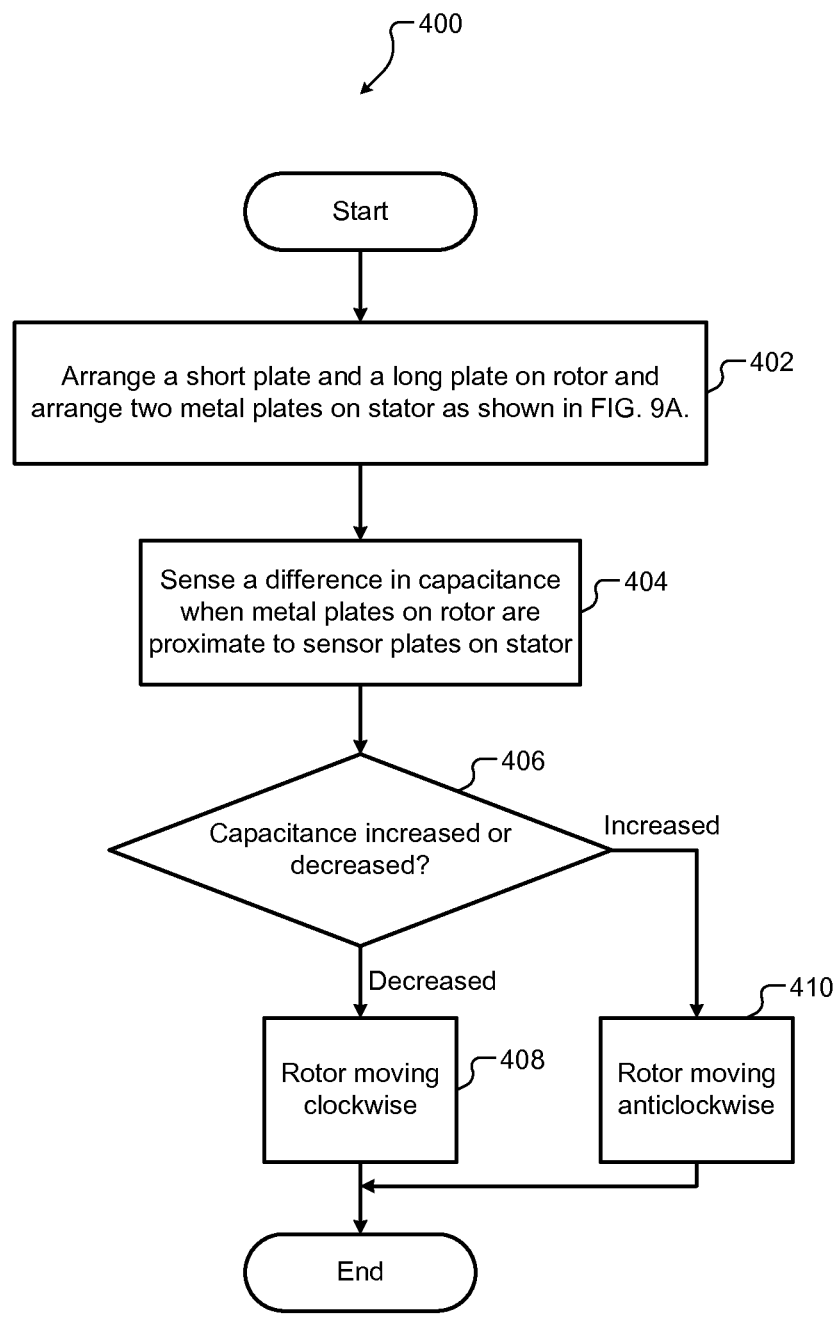
FIGS. 11A and 11B depict flowcharts of methods for determining and confirming a direction of rotation of the rotor according to the present disclosure.

Referring now to FIG. 11A, a method 400 for detecting a direction of rotation of the rotor 110 is shown. At 402, a short metal plate and a long metal plate are arranged on the rotor 110, and two sensor plates of the same size are arranged on the stator 112 as shown in FIG. 9A. At 404, control senses a difference in capacitance when the metal plates on the rotor 110 pass over the sensor plates on the stator 112. At 406, control determines whether the capacitance increased or decreased. At 408, control determines that the rotor 110 is moving clockwise if the capacitance decreased. At 410, control determines that the rotor 110 is moving counterclockwise if the capacitance increased.

Figure 11B:
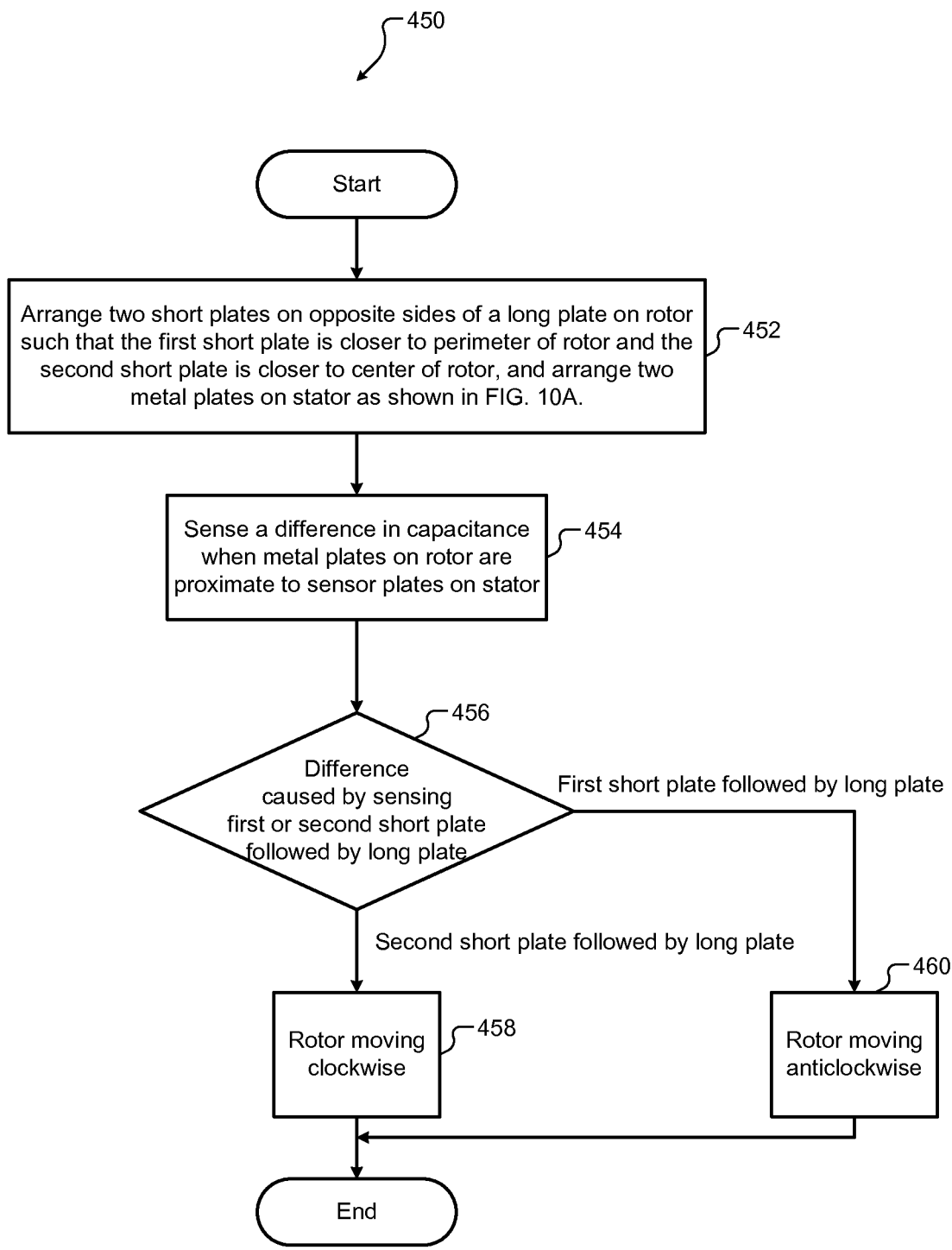

Referring now to FIG. 11B, a method 450 for detecting a direction of rotation of the rotor 110 is shown. At 452, two short metal plates are arranged on opposite sides of a long metal plate such that the first short metal plate is closer to the perimeter of the rotor 110, and the second short metal plate is closer to the center of the rotor 110 as shown in FIG. 10A. Additionally, two sensor plates of the same size are arranged on the stator 112 as shown in FIG. 10A.

At 454, control senses a difference in capacitance when the metal plates on the rotor 110 pass over the sensor plates on the stator 112. At 456, control determines whether the difference in capacitance is caused by first sensing the first or second short metal plate and subsequently sensing the long metal plate. At 458, control determines that the rotor 110 is rotating clockwise if the difference in capacitance is caused by first sensing the second short metal plate followed by sensing the long metal plate. At 460, control determines that the rotor 110 is moving counterclockwise if the difference in capacitance is caused by first sensing the first short metal plate followed by sensing the long metal plate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A motor comprising:
a rotor including (i) a first metal plate having a first size and (ii) a second metal plate having a second size, wherein each of the first metal plate and the second metal plate is arranged on a first surface associated with the rotor,
wherein the first metal plate and the second metal plate are arranged adjacent to each other at a predetermined distance from an axis of rotation of the rotor, and
wherein the first surface rotates along a plane perpendicular to the axis about the axis in response to the rotor being rotated about the axis; and
a stator including a third metal plate arranged on a second surface associated with the stator, wherein the third metal plate is arranged on the second surface at the predetermined distance from the axis, and wherein the second surface is parallel to the first surface and faces the first surface.

2. A system comprising:
the motor of claim 1; and
a capacitance sensing module configured to sense, in response to the rotor being rotated, (i) a first capacitance in response to the first metal plate being proximate to the third metal plate and (ii) a second capacitance in response to the second metal plate being proximate to the third metal plate,
wherein the second capacitance is different than the first capacitance.

3. The system of claim 2, further comprising a direction determination module configured to determine a direction of rotation of the rotor based on the first capacitance and the second capacitance.

4. The system of claim 2, further comprising a direction determination module configured to determine a direction of rotation of the rotor by comparing a period of revolution of the rotor to a time interval between sensing the first capacitance and the second capacitance during one revolution of the rotor.

5. The system of claim 2, wherein the capacitance sensing module is configured to sense the first capacitance or the second capacitance at a first time and a second time during two successive revolutions of the rotor, the system further comprising a position determining module configured to determine position of the rotor based on (i) time elapsed from sensing the first capacitance or the second capacitance and (ii) a difference between the first time and the second time.

6. A system comprising:
a motor including
(i) a first metal plate and a second metal plate, wherein each of the first metal plate and the second metal plate is arranged on a first surface associated with a rotor of the motor, and wherein the first surface rotates along a plane perpendicular to an axis of rotation of the rotor about the axis in response to the rotor being rotated about the axis; and
(ii) a third metal plate arranged on a second surface associated with a stator of the motor; and
a capacitance sensing module configured to sense, in response to the rotor being rotated, (i) a first capacitance in response to the first metal plate aligning with the third metal plate and (ii) a second capacitance in response to the second metal plate aligning with the third metal plate.

7. The system of claim 6, wherein:
the first metal plate has a different size than the second metal plate;
the first, second, and third metal plates are arranged at a predetermined distance from the axis of rotation of the rotor; and
the first surface is parallel to and faces the second surface.

8. The system of claim 6, further comprising a direction determination module configured to determine a direction of rotation of the rotor based on the first capacitance and the second capacitance.

9. The system of claim 6, further comprising a direction determination module configured to determine a direction of rotation of the rotor by comparing a period of revolution of the rotor to a time interval between sensing the first capacitance and the second capacitance during one revolution of the rotor.

10. The system of claim 6, wherein the capacitance sensing module is configured to sense the first capacitance or the second capacitance at a first time and a second time during two successive revolutions of the rotor, the system further comprising a position determining module configured to determine position of the rotor based on (i) time elapsed from sensing the first capacitance or the second capacitance and (ii) a difference between the first time and the second time.

* * * * *